116° C. which was recrystallized in the same way to yield 0.082 gram of monomethyl F.E.S. having a melting point of 120°–122° C. and the following analysis:

|  | Calc. ($C_{19}H_{24}O_5$) | Found |
|---|---|---|
| Percent C | 68.7 | 68.3 |
| Percent H | 7.28 | 7.38 |
| Percent $OCH_3$ | 9.34 | 9.17 |

The following example demonstrates the activity of the new compounds according to the mouse-uterine test. Under the mouse-uterine test, a solution of the test substance is placed on a standard pulverized mouse ration and the solvent is removed by evaporation to provide a dry ration containing a known weight of the substance per gram of ration. This ration is then fed to ovariectomized mice weighing about 20 grams at a level of 3 grams per mouse per day for a period of 5 days after which the mice are weighed and the uteri removed and weighed. An increase in the weight of the uterus over the weight of the uterus in a control animal demonstrates the presence of estrogenic activity for the test substance. The magnitude of the increase is proportional to the weight of the estrogen consumed. The method can be used as a quantitative assay by comparison with responses obtained with a pure form of the estrogen under examination.

In a test involving 10 mice with control mice having an average uterus weight of 11.6 milligrams, when the product of Example VI melting at 178°–180° C. was added at a level of 3.125 micrograms, per gram of feed, the uterus weight was 21.4 milligrams on the average. At 6.25 micrograms per gram of feed, the average uterus weight was 26.8 milligrams. When compared with F.E.S. at a level of 6.25 micrograms per gram of feed, this amounts to 307.69 percent of the response to F.E.S. By extrapolation of a F.E.S. response curve to a 3.125 microgram per gram of feed level, the response to the compound is 445.5 percent of the calculated response to F.E.S.

In a separate test involving 10 mice with control mice having an average uterus weight of 11.6 milligrams when the product of Example VI, melting at 146°–148° C., was added at a level of 3.125 micrograms per gram of feed, the uterus weight was 15.0 milligrams on the average. When compared with F.E.S. at a level of 6.25 micrograms per gram of feed, this amounts to 123.9 percent of the response to F.E.S. By extrapolation of a F.E.S. response curve to a 3.125 microgram per gram of feed level, the response to the compound is 154.5 percent of the calculated response to F.E.S.

*Example IX*

Six head of cattle are fed a daily ration including a mixture of alfalfa hay and ground corn cobs containing from 1 to 20 ounces of tetrahydro F.E.S. per hundred pounds of ration to increase the rate of growth of the cattle.

It is claimed:

1.

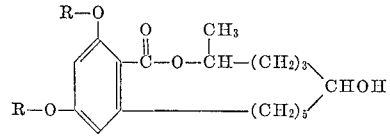

wherein R is selected from the group consisting of hydrogen and lower alkyl.

2. The compound of claim 1 wherein R is hydrogen and it has a melting point between about 146 and 148° C. and the following optical activity: $[\alpha]_D^{25} =$ about $+39°$.

3. The compound of claim 1 wherein R is hydrogen and it has a melting point between about 178 and 180° C. and the following optical activity: $[\alpha]_D^{25} =$ about $+46°$.

4. The compound of claim 1 wherein R is lower alkyl.

5. An animal feed comprising a nutritional diluent and growth promoting amounts of the compound of claim 1.

6. The compound of claim 1 wherein R is methyl.

7. The compound of claim 1 wherein R on the ring ortho to the ester group is methyl and the other R is hydrogen.

8. The compound of claim 1 wherein R on the ring para to the ester group is methyl and the other R is hydrogen.

9. An animal feed comprising a nutritional diluent and growth promoting amounts of the compound of claim 2.

10. An animal feed comprising a nutritional diluent and growth promoting amounts of the compound of claim 3.

11. An animal feed comprising a nutritional diluent and growth promoting amounts of the compound of claim 6.

12. An animal feed comprising a nutritional diluent and growth promoting amounts of the compound of claim 7.

13. An animal feed comprising a nutritional diluent and growth promoting amounts of the compound of claim 8.

References Cited by the Examiner

UNITED STATES PATENTS 2,842,051  7/1958  Brian et al. _____ 99—2

OTHER REFERENCES

Stob et al.: Nature, vol. 196, page 1318, December 29, 1962, QI N2.

A. LOUIS MONACELL, *Primary Examiner.*

3,239,345
ESTROGENIC COMPOUNDS AND ANIMAL
GROWTH PROMOTERS
Edward B. Hodge, Phil H. Hidy, and Herbert L. Wehrmeister, all of Terre Haute, Ind., assignors to Commercial Solvents Corporation, a corporation of Maryland
No Drawing. Filed Feb. 15, 1965, Ser. No. 432,826
13 Claims. (Cl. 99—2)

The present invention relates to new compounds and an object of the present invention is to provide compounds which exhibit estrogenic activity or aid in increasing the rate of growth in meat-producing animals, e.g. cattle, lamb and swine.

A conventional formula for the compounds of the present invention is:

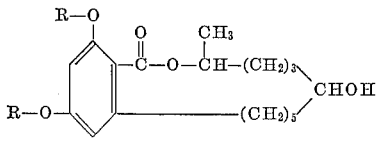

where R is hydrogen or substituted or unsubstituted alkyl, e.g. lower alkyl such as methyl, ethyl, hexyl, etc., but hydrogen is preferred. Compounds having the above formula wherein R is substituted or unsubstituted aryl, e.g. phenyl and bromophenyl; acyl, e.g. acetyl and valeryl; and aralkyl, e.g. benzyl, are also contemplated by the present invention. There are two diastereoisomers of the compounds of the present invention and when R is H, one has three to four times more activity than the other. The diastereoisomers can be distinguished by melting point and since the higher melting is less soluble in, for example, isopropyl alcohol-water mixtures, the diastereoisomers are separable.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new products are to be administered in feeds, an animal feed composition may be prepared containing the usual nutritionally-balanced quantities of carbohydrates, proteins, vitamins and minerals, together with the compounds of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g. vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances is desired.

The compounds of the present invention can be produced from the compound:

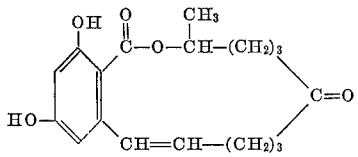

hereinafter referred to as the fermentation estrogenic substance (F.E.S.) by reduction of the olefinic bond and the ketone group in the presence of hydrogen to add four hydrogen atoms using conventional reduction procedures, for instance, in the presence of a Raney nickel catalyst. The nomenclature used herein is based upon the F.E.S. compound. For example, the compound produced upon reduction of both the olefinic bond and the ketone group is referred to as tetrahydro F.E.S. Compounds of this invention where both R's are alkyl are referred to as dialkyl-, and where one of the R's is alkyl as monoalkyl-, tetrahydro F.E.S.

The reduction of F.E.S. is preferably carried out with the F.E.S. suspended or dissolved in a suitable solvent, e.g. an alcohol, preferably a lower alkanol such as methanol, ethanol, etc. In general, the reduction can be accomplished at ambient temperatures and ambient pressures. Preferable temperatures are from about 15° to 40° C., and preferable pressures are of from about 1 to 100 atmospheres. In general, from about 0.1 to 5 grams of catalyst are used per gram of F.E.S.

In producing compounds of the present invention where R is alkyl, conventional alkylation procedures can be used to replace the H atom of one or both of the OH groups on the benzene ring of F.E.S. with an alkyl group. Alkylated tetrahydro F.E.S. compounds can be produced, for example, by first alkylating F.E.S. and then reducing it as set forth supra. The alkylation can be by reaction with the corresponding dialkyl sulfates, e.g. dimethyl sulfate, diethyl sulfate, etc. to produce the dialkyl F.E.S. or a monoalkyl F.E.S. with the alkyl group replacing the hydrogen of the hydroxyl group on the benzene ring ortho to the ester group. Furthermore, a monomethyl F.E.S. compound with the methyl group replacing the hydrogen of the hydroxyl group para to the ester group can be selectively produced using diazomethane.

The fermentation estrogenic substance (F.E.S.) is so named since a convenient method for producing it is by cultivating, on a suitable nutrient medium, the organism *Gibberella zeae* (Gordon), on deposit at the Northern Utilization Research and Development Division of the United States Department of Agriculture under the number NRRL–2830.

The following examples are offered to illustrate this invention; however, the invention is not limited to the specific materials, amounts, and procedures set forth. The first example illustrates preparation of a suitable inoculum containing the organism *Gibberella zeae* (Gordon) NRRL–2830.

*Example I*

A spore sand culture containing *Gibberella zeae* (Gordon) NRRL–2830 was aseptically placed in a sterile tube containing 15 milliliters of Czapek's-Dox solution and a small amount of agar. This medium was then incubated for about 168 hours at approximately 25° C. At the end of the incubation period, the medium was washed with 5 milliliters of sterile deionized water and transferred to a sterile tube containing 45 milliliters of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL–2830 to produce F.E.S.

*Example II*

To a 2 liter flask were added 300 grams of finely divided corn. The flask and its contents were then sterilized and after sterilization 150 milliliters of sterile deionized water were added. To the mixture in the flask were then added 45 milliliters of the inoculum pre-